Patented Apr. 30, 1929.

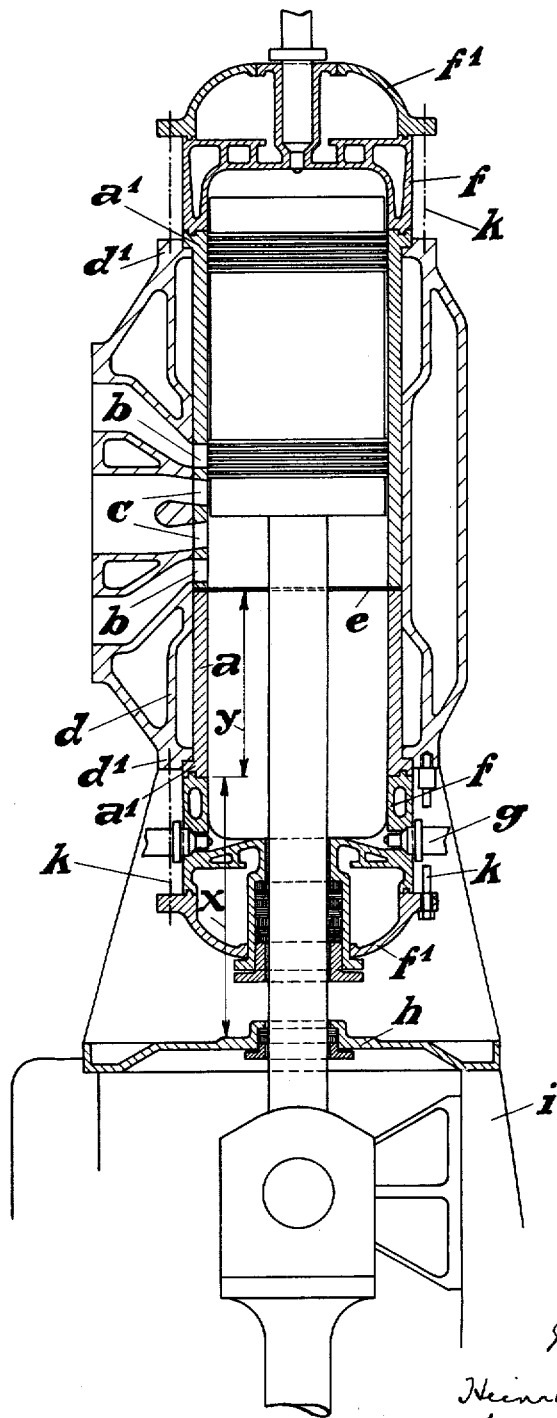

1,710,857

UNITED STATES PATENT OFFICE.

HEINRICH BECKER, OF AUGSBURG, GERMANY, ASSIGNOR TO THE FIRM: MASCHINEN-FABRIK AUGSBURG-NUERNBERG, AKTIENGESELLSCHAFT, OF AUGSBURG, GERMANY, A CORPORATION OF GERMANY.

CYLINDER FOR DOUBLE-ACTING TWO-STROKE DIESEL ENGINES WITH SLOTTED EXHAUST OPENING AND DIVIDED CYLINDER LINER.

Application filed February 1, 1928, Serial No. 251,211, and in Germany February 9, 1927.

This invention relates to internal combustion engines, and is particularly applicable to double-acting Diesel engines having a divided cylinder liner.

The principal object of the invention is the provision in an engine of the character mentioned, of a transversely divided cylinder liner, the sections of which may be readily removed from the cylinder body without necessitating the complete disassembly of the engine, or the removal of the cylinder body from the adjacent end of the crank case.

A further object of the invention is the provision of an engine of the double-acting two-stroke Diesel type having a slotted exhaust opening, in which the cylinder liner is divided below the slotted openings in the cylinder wall, the distance from the end of the cylinder liner to the adjacent transverse crank-case of the cylinder body standards being greater than the length of the lower cylinder liner section, removable cylinder ends or heads providing the entire combustion chambers being employed so that the water jacket of the cylinder body does not extend beyond the flanged ends of the cylinder liners.

Other objects and advantages of the invention will be apparent from the following description and from the accompanying drawing.

In the drawing one form of the invention, as applied to a double-acting two-stroke slotted exhaust Diesel engine, is illustrated in central vertical section. The engine comprises a cylinder body $d$ in which is removably fixed the cylinder liner $a$, in the form of a sleeve having the "in" and "out" slots or ports $b$ and $c$ for scavenging. The liner is divided transversely along the line $e$ which is located beneath the various slotted openings so that the latter are provided in the upper liner section in accordance with the present invention. The cylinder is provided at each end with a two-part cylinder cover or head comprising an inner cover portion $f$ and an outer cap $f'$. The side walls of the inner cover portion $f$ extends sufficiently far towards the middle of the cylinder so that the combustion chambers are completely defined by the removable cylinder heads. Thus the connecting flanges $a'$ of the cylinder liner and $d'$ of the cylinder body lie at one side of the combustion chamber and in a comparatively cooler zone, so that the danger of fractures or crevices due to material increase or expansion is reduced or eliminated. As shown in the drawing the flanges $d'$ of the cylinder body do not extend beyond the flanges $a'$ of the cylinder liner. A water jacket is provided by the cylinder body $d$ and the cylinder liner, and the length of this water jacket does not exceed the length of the cylinder liner, as shown. The cylinder head sections are firmly mounted in place as by means of the studs or bolts $k$ the ends of which are received in the adjacent ends of the cylinder body $d$. These bolts are readily accessible to permit the removal of the cylinder heads. The various ports $g$ for fuel, starting, and safety valve are preferably provided directly upon the cylinder head, and as shown, are provided in the section $f$ in the lower cylinder head, and in the center of the upper cylinder head. The fuel ports are thus independent of the water jacket.

The distance $x$ between the lower side of the cylinder liner and the upper transverse support $h$ of the engine crank case $i$ is greater than the length $y$ of the lower section of the cylinder liner. The cylinder body is provided with standards which are connected at their lower ends to the support $h$. The cylinder is provided with the customary piston operatively connected to the piston-rod which is slidingly received in the lower cylinder head.

It will now be apparent that the complete removal of the lower liner section is possible without the entire disassembly of the machine and without disconnecting the cylinder body from the adjacent end of the crank case. After the removal of the piston and the piston-rod towards the top of the cylinder, the lower cylinder head sections $f$ and $f'$ are released by the removal of the studs $k$. The sections $f$ and $f'$ are then removed, after which the lower cylinder liner section may be drawn downwardly toward the crank case and removed towards the side. The arrangement of the parts, as just described, permits the total height of the machine to be kept a minimum while permitting the accessibility mentioned. Furthermore the construction has the advantage of permitting the various ports such as the fuel, starting, and safety valve ports to be located in the cylinder head sections so that they are entirely independent of the water jacket of the engine. The water circulation system of the cylinder is therefore uneffected by these ports.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an internal combustion engine, a cylinder body, a support therefor spaced from the end of the cylinder body, and aligned upper and lower cylinder liner sections in said cylinder body, the lower section being shorter than the distance from its lower end to the said support whereby the said lower section may be readily removed towards the support without disassembling the cylinder body from the support.

2. In an internal combustion engine of the double-acting Diesel type, a cylinder body, a support therefor spaced from the end of the cylinder body, and aligned upper and lower cylinder liner sections in said cylinder body, the cylinder body and the upper liner section having slotted openings adjacent the center of the cylinder, the line of division of the cylinder liner sections being located beneath the slots, and the distance between the end of the cylinder liner and the transverse connection of the cylinder to the support being greater than the length of the lower cylinder liner section.

3. In an internal combustion engine, a cylinder body, a support therefor, aligned upper and lower cylinder liner sections in said cylinder body, the lower section being shorter than the distance from its lower end to the said support to permit removal of the lower section, and a cylinder head removably attached to one end of the cylinder body and providing substantially the entire combustion chamber at that end of the cylinder.

4. In an internal combustion engine of the double-acting two-stroke Diesel type, a cylinder body, a support therefor, aligned upper and lower cylinder liner sections in said body, the body and the upper liner section having slotted openings adjacent the center of the cylinder, the lower liner section being shorter than the distance from its lower end to the said support to permit the downward removal of the lower liner section without disassembling the cylinder body from the support, and a cylinder head removably attached at each end of the cylinder body at points approximately coinciding with the ends of the cylinder liner, substantially the entire combustion chambers being defined by said cylinder heads.

5. In an internal combustion engine of the double-acting two-stroke Diesel type, a cylinder body, a support therefor, aligned upper and lower cylinder liner sections in said body, the body and the upper liner section having slotted openings adjacent the center of the cylinder, the lower liner section being shorter than the distance from its lower end to the said support to permit the downward removal of the lower liner section without disassembling the cylinder body from the support, and a cylinder head removably attached at each end of the cylinder body at points approximately coinciding with the ends of the cylinder liner, substantially the entire combustion chambers being defined by said cylinder heads, said cylinder body providing a water jacket having a length not exceeding the distance between the outer ends of the cylinder liner, and ports provided in the cylinder heads independent of the water jacket.

In testimony whereof I hereto affix my signature.

HEINRICH BECKER.